(12) United States Patent
Lee et al.

(10) Patent No.: US 9,866,027 B2
(45) Date of Patent: Jan. 9, 2018

(54) DEVICE AND METHOD FOR CONTROLLING HIGH VOLTAGE DIRECT CURRENT TRANSMISSION SYSTEM

(71) Applicant: LSIS CO., LTD., Anyang-si, Gyeonggi-do (KR)

(72) Inventors: Seung Hun Lee, Namyangju-si (KR); Eung Soo Kim, Anyang-si (KR); Jong Bae Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 249 days.

(21) Appl. No.: 14/597,057

(22) Filed: Jan. 14, 2015

(65) Prior Publication Data

US 2015/0207325 A1 Jul. 23, 2015

(30) Foreign Application Priority Data

Jan. 23, 2014 (KR) .................. 10-2014-0008586

(51) Int. Cl.
 *H03M 13/00* (2006.01)
 *H02J 3/36* (2006.01)
 *H02M 5/40* (2006.01)
 *H04L 1/20* (2006.01)

(52) U.S. Cl.
 CPC ............. *H02J 3/36* (2013.01); *H02M 5/40* (2013.01); *H04L 1/20* (2013.01); *Y02E 60/60* (2013.01)

(58) Field of Classification Search
 CPC .... H02J 3/36; H04L 1/20; H02M 5/40; Y02E 60/60; H02H 7/268; H02H 3/05; H02H 5/105; H02H 3/17; G01R 31/11
 See application file for complete search history.

(56) References Cited

U.S. PATENT DOCUMENTS

| 4,672,519 A | 6/1987 | Liss |
| 4,685,040 A | 8/1987 | Steigerwald et al. |
| 6,130,619 A | 10/2000 | Nakatani |
| 2009/0001993 A1* | 1/2009 | Lindsey ............... B60L 3/0023 324/509 |

(Continued)

FOREIGN PATENT DOCUMENTS

| CN | 101278473 | 10/2008 |
| CN | 101958541 | 1/2011 |

(Continued)

OTHER PUBLICATIONS

European Patent Office Application Serial No. 15151400.7, Search Report dated Jul. 6, 2015, 7 pages.

(Continued)

*Primary Examiner* — Guerrier Merant
(74) *Attorney, Agent, or Firm* — Lee, Hong, Degerman, Kang & Waimey

(57) ABSTRACT

A device for controlling a high voltage direct current (HVDC) transmission system is provided. The device includes: a communication unit communicating with a control device; a control unit obtaining a databack signal received through the communication unit, checking a data line error and a line connection error based on an obtained databack signal, and outputting a valve control signal based on the databack signal; and an output unit outputting the valve control signal to a valve control device based on control of the control unit.

18 Claims, 4 Drawing Sheets

(56) References Cited

U.S. PATENT DOCUMENTS

| | | | | |
|---|---|---|---|---|
| 2010/0145537 A1* | 6/2010 | Priebe | .................... | H02H 7/268 |
| | | | | 700/293 |
| 2011/0282508 A1* | 11/2011 | Goutard | ................. | H04L 63/20 |
| | | | | 700/293 |
| 2012/0256637 A1* | 10/2012 | Juhlin | .................... | G01R 31/11 |
| | | | | 324/523 |
| 2013/0088802 A1* | 4/2013 | Berggren | ............... | H02H 7/268 |
| | | | | 361/65 |

FOREIGN PATENT DOCUMENTS

| | | |
|---|---|---|
| GB | 2002974 | 2/1979 |
| JP | 55-68825 | 5/1980 |
| JP | 58-133122 | 8/1983 |
| JP | 63-007169 | 1/1988 |
| JP | 09-322524 | 12/1997 |
| JP | 2011-147334 | 7/2011 |
| JP | 2011-205812 | 10/2011 |

OTHER PUBLICATIONS

Korean Intellectual Property Office Application Serial No. 10-2014-0008586, Notice of Allowance dated Oct. 7, 2015, 2 pages.
The State Intellectual Property Office of the People's Republic of China Application Serial No. 201510086170.0, Office Action dated Jul. 26, 2016, 8 pages.
Japan Patent Office Application Serial No. 2015-011372, Office Action dated Nov. 17, 2015, 8 pages.

* cited by examiner

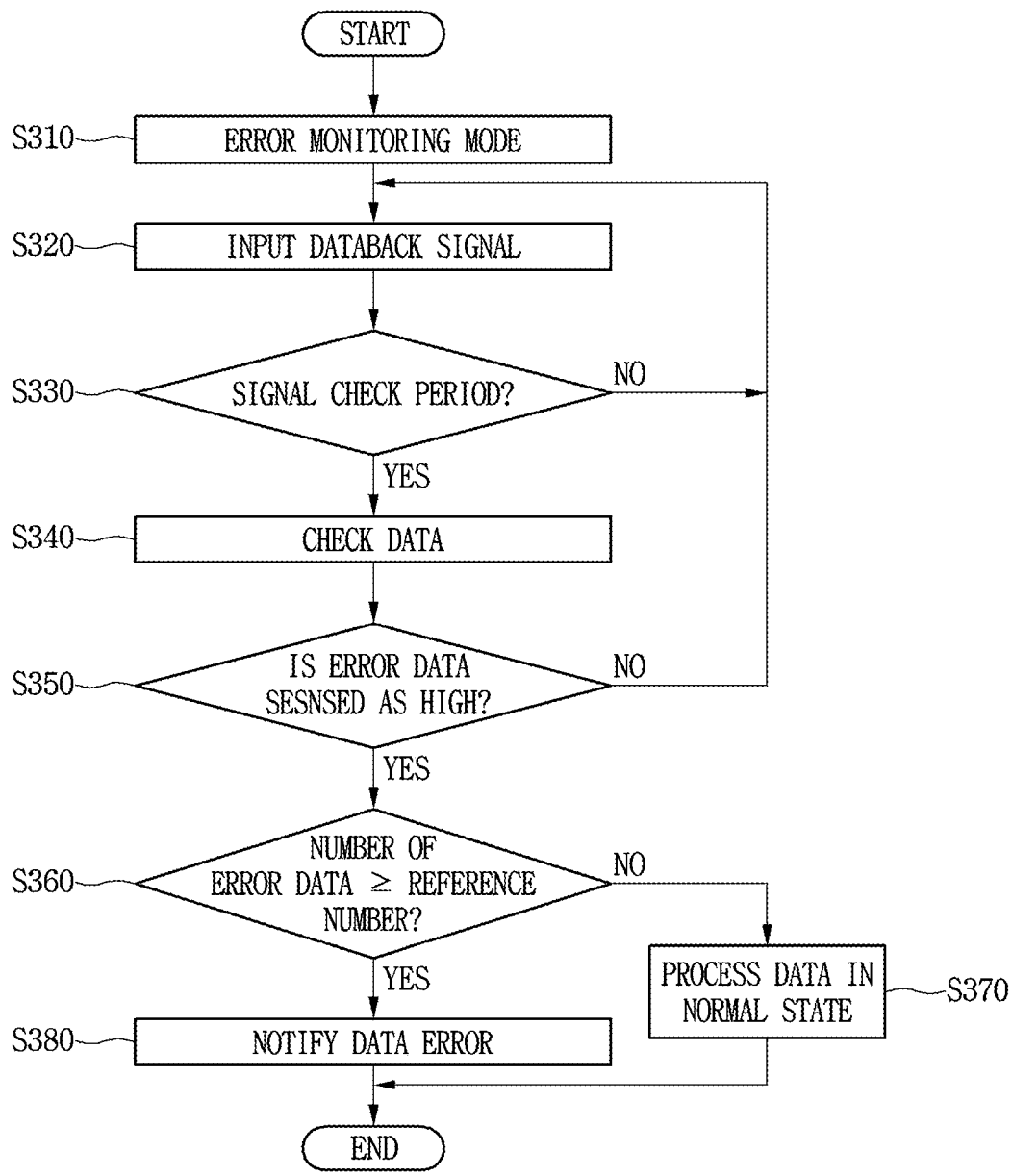

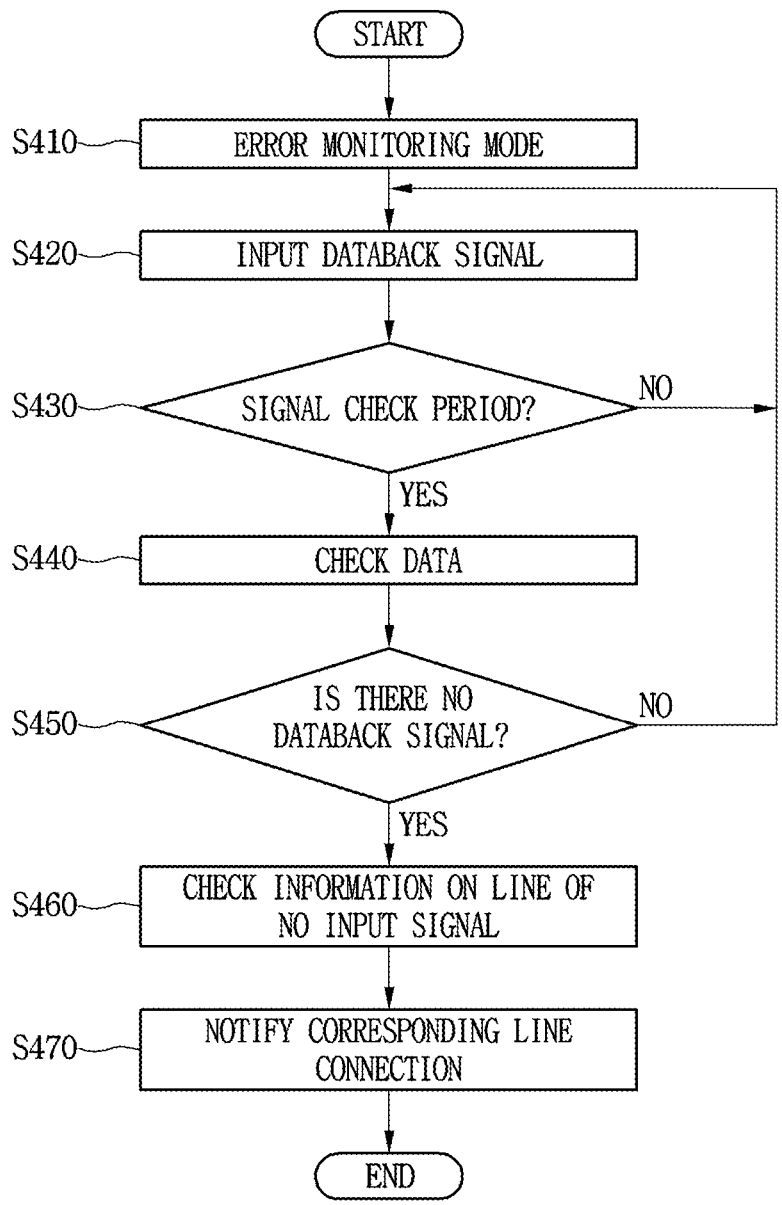

ental power transmission through a voltage increase that is the advantage of AC power transmission. Also, the HVDC transmission may overcome many limitations of the AC transmission.

DEVICE AND METHOD FOR CONTROLLING HIGH VOLTAGE DIRECT CURRENT TRANSMISSION SYSTEM

CROSS-REFERENCE TO RELATED APPLICATION

Pursuant to 35 U.S.C. §119(a), this application claims the benefit of earlier filing date and right of priority to Korean Application No. 10-2014-0008586, filed on Jan. 23, 2014, the contents of which is incorporated by reference herein in its entirety.

BACKGROUND

The present disclosure relates to a device and method for controlling a high voltage direct current (HVDC) transmission system.

HVDC transmission is performed by converting alternating current (AC) power generated from a power station into DC power to transmit the DC power and then re-converting the DC power into the AC power at a power receiving point to supply power. The HVDC transmission may enable efficient and economical power transmission through a voltage increase that is the advantage of AC power transmission. Also, the HVDC transmission may overcome many limitations of the AC transmission.

A HVDC transmission system may be classified into current-type HVDC using a thyristor and voltage-type HVDC using IGB or GTO. The current-type HVDC is suitable for large power transmission and the voltage-type HVDC is suitable for system stabilization or small power transmission due to high loss.

In particular, the valve controller of the HVDC transmission system may affect the performance of the entire HVDC transmission system depending on how stably measured data may be maintained and controlled in DC transmission. There is a need for the stability and smooth data flow control of an HVDC transmission system structure.

In general, data state monitoring consumes a long time to check the cause of an event and to perform corresponding processing while monitoring by software.

That is, there is a need for a hardware design considering high data reliability and possible events for a state contact of a physical line connected to the HVDC transmission system and a state contact of data. However, since a typical HVDC transmission system is configured to analyze measurement data transmitted to the system and simply distribute analyzed data to a valve control module when the measurement data is transmitted to the system, there is a limitation in that it is not easy to analyze a cause of an event and process the event.

SUMMARY

Embodiments provide a device and method for controlling a high voltage direct current (HVDC) transmission system that enable data validity and a connection state to be checked based on data obtained from the HVDC transmission system.

Embodiments provide a device and method for controlling a high voltage direct current (HVDC) transmission system that enable the effectiveness of data obtained from the HVDC transmission system and a connection state to be checked so that it is possible to output control data for valve control having high reliability.

In one embodiment, a device for controlling a high voltage direct current (HVDC) transmission system includes: a communication unit communicating with a control device; a control unit obtaining a databack signal received through the communication unit, checking a data line error and a line connection error based on an obtained databack signal, and outputting a valve control signal based on the databack signal; and an output unit outputting the valve control signal to a valve control device based on control of the control unit.

In another embodiment, a method of controlling a HVDC transmission system includes: checking a data error and a line connection error depending on presence and absence of an error data output of the databack signal and on presence and absence of an input of the databack signal based on an obtained databack signal; and notifying that the data error or line connection error is sensed.

The details of one or more embodiments are set forth in the accompanying drawings and the description below. Other features will be apparent from the description and drawings, and from the claims.

BRIEF DESCRIPTION OF THE DRAWINGS

FIG. 3 is a flow chart for data error verification according to an embodiment.

FIG. 4 is a flow chart for data error verification according to an embodiment.

DETAILED DESCRIPTION OF THE EMBODIMENTS

Figure 1:
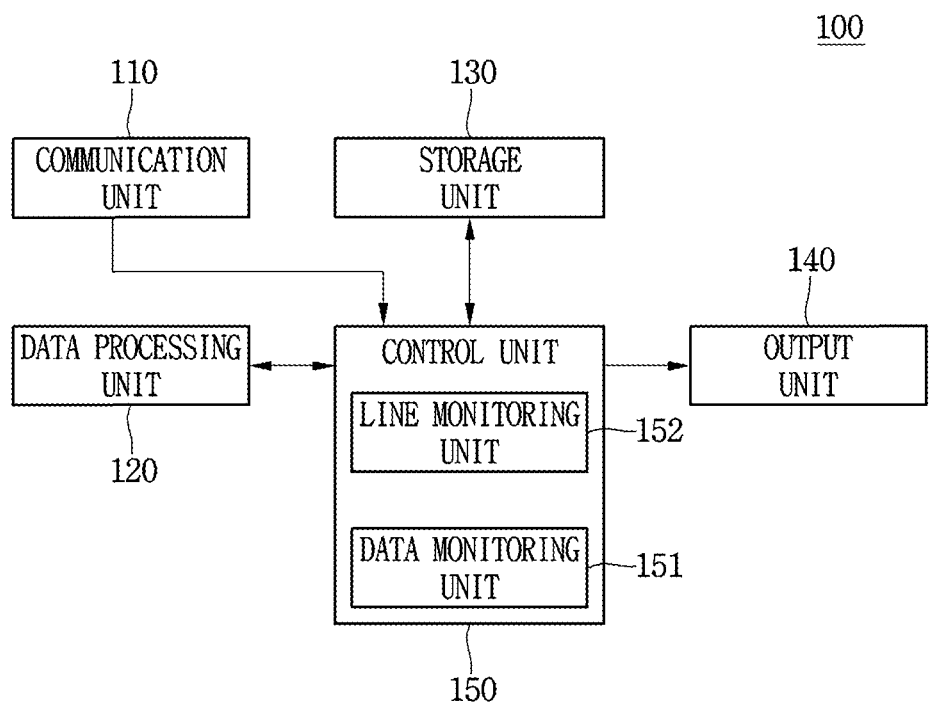
FIG. 1 is a block diagram of a control device of a high voltage direct current (HVDC) transmission system to which an embodiment is applied.

The terms or words used in the detailed description and claims should not be limitatively construed as typical meanings or meanings indicated in dictionaries but should be construed as meanings and concepts matching the technical spirit of the present invention based on the principle that the inventor may properly define the concepts of terms in order to describe his or her invention in the best mode.

Thus, since embodiments described in the detailed description and configurations shown in the drawings are only examples and do not cover all the technical spirits of an embodiment, it should be understood that there may be various equivalents and variations that may replace them upon filing the present application.

Figure 2:
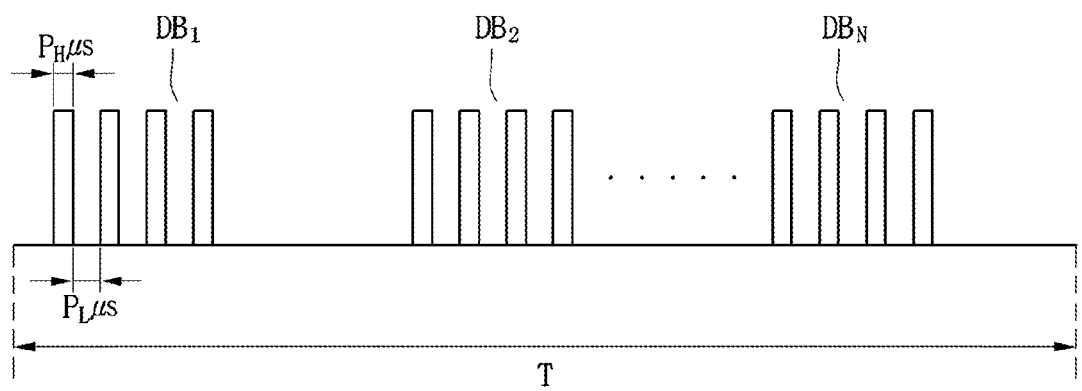
FIG. 2 illustrates the form of data obtained from the control device of the HVDC transmission system according to an embodiment.

FIG. 1 is a block diagram of a control device of a high voltage direct current (HVDC) transmission system to which an embodiment is applied, and FIG. 2 illustrates the form of data obtained from the control device of the HVDC transmission system according to an embodiment.

Referring to FIGS. 1 and 2, a control device 100 of the HVDC transmission system according to an embodiment may include a communication unit 110, a data processing unit 120, a storage unit 130, an output unit 140, and a control unit 150.

The communication unit 110 may receive data on each device connected to the HVDC transmission system.

The data processing unit 120 may decode data received through the communication unit 110 to output decoded data to the control unit 150. Also, it may encode data analyzed and processed by the control unit 150 after the decoding to output encoded data to a higher application block.

The storage unit 130 may store data received from the communication unit 110 or store information on how the data has been processed. Also, the storage unit 130 may store data checked by the control unit 150, reference information for checking a line error, and check result information.

The output unit 140 may data calculated and processed by the data processing unit 120 and the control unit 150 to a valve control unit (not shown) as a valve control value.

The control unit 150 may monitor the state of data obtained from each controller module connected to the HVDC transmission system obtained through the communication unit 110 and generate valve control data accordingly.

In particular, the control unit 150 according to an embodiment may include a data monitoring unit 151 and a line monitoring unit 152.

The data monitoring unit 151 may detect errors of data measured and applied from controllers and check the states of data. The data monitoring unit 151 may check the presence and absence of the errors of data based on pulse data including M groups including N signals as shown in FIG. 2.

The line monitoring unit 152 may check the reception (receiving rate) of data preset based on the same data as that monitored by the data monitoring unit 151 to check the presence and absence of a line connection.

The type of data obtained in an embodiment may be M databack groups DMn signals including N pulse signals for a certain period T as shown in FIG. 2. The data obtained from the control device 100 of the HVDC transmission system according to an embodiment may be a pulse signal received for 4 ms ($P_H$ms) at an interval of 4 ms ($P_L$ms) for a period T of 16.67 ms. The data input period, section and interval may vary depending on an embodiment.

Each of the databack signals includes thyristor conduction information, gamma operation information, and break-over diode (BOD) information.

The control unit 150 may monitor a data error and line connection according to various pieces of information included in the databack signal and depending on the presence and absence of an input of a signal.

In the following, data and line error monitoring operations according to an embodiment are described in detail with reference to FIGS. 3 and 4.

FIG. 3 is a flow chart for data error verification according to an embodiment.

Although it is described as an example that the control unit 150 for the data error verification according to an embodiment is performed at the monitoring unit 151 included in the control unit, the function may be a portion of the overall operations of the control unit 150. The data monitoring unit 151 may be configured in the control unit 150 to be integrated into the control unit 150 or configured in a separate external device.

Referring to FIG. 3, the control unit 150 according to an embodiment may obtain data from control devices connected to the HVDC transmission system and operate in an error monitoring mode in which obtained data is monitored, in step S310.

The control unit 150 may receive the databack signals DB1 to DBN as shown in FIG. 2 according to the error monitoring mode in step S320.

The control unit 150 may determine whether a check period for checking the presence and absence of an error and state information on the databack signal has arrived in step S330.

The check period may correspond to a pulse input period included in the databack signal and is described with e.g., 4 ms in an embodiment.

The control unit 150 may check the state of data and the presence and absence of error data based on pulse signal data included in the databack signal when the check period of the databack signal has arrived.

The control unit 150 may check whether error data included in each data in the pulse signal data is output to be high in step S350.

When there is no error in data obtained from a control device, error data may be included and output as a low signal in the pulse signal, and when there is an error in the data, the error data may be included and output as a high signal in a pulse signal of corresponding data.

Thus, the control unit 150 may determine whether pulse signal data has error data having a high signal, and when there is error data, it is possible to count the number of error data.

The control unit 150 may determine whether the number of counted error data or the number of pulse signals of error data represented by high is equal to or larger than a reference number in step S360. The reference number may be a level at which error data affects system and valve control. Thus, the reference number is not limited and may vary according to a system or user setting.

When the number of the counted error data is smaller than the reference number, the control unit 150 may determine that obtained data is in a normal state and output the data to a valve control device (not shown).

On the contrary, when the number of the counted error data is equal to or larger than the reference number, the control unit 150 may determine that the obtained data is error data and output a corresponding result in various forms, in step S380.

FIG. 4 is a flow chart for line connection error verification according to an embodiment.

Although it is described as an example that the control unit 150 for the line connection error verification is performed at the line monitoring unit 152 included in the control unit 150, the function may be a portion of the overall operations of the control unit 150. The line monitoring unit 152 may be configured in the control unit 150 to be integrated into the control unit 150 or configured in a separate external device.

Referring to FIG. 4, the control unit 150 according to an embodiment may obtain data from control devices connected to the HVDC transmission system by using physical lines and operate in an error monitoring mode in which obtained data is monitored, in step S410.

The control unit 150 may receive the databack signals DB1 to DBN as shown in FIG. 2 according to the error monitoring mode, in step S420.

The control unit 150 may determine whether a check period for checking the presence and absence of an error and state information on the databack signal has arrived in step S430. The check period may correspond to a pulse input period included in the databack signal and is described with e.g., 4 ms to be the same as the data check period of the data error verification in an embodiment.

The control unit 150 may check the presence and absence of no input data based on pulse signal data included in the databack signal when the check period of the databack signal has arrived, in step S440.

Simultaneously with or separately from the data error verification, the control unit 150 check at the line monitoring unit 152 based on obtained data whether there is a databack signal not received among preset N (22 in an embodiment) databack signals.

The control unit 150 may check based on the databack signal whether a line signal is input to a line connected physically to control devices and check whether there is on input databack signal, in step S450.

The control unit 150 may check information on a physical line receiving a signal not input when no input signal among databack signals is checked in step S460.

The control unit 150 may define that the no input databack signal is an event generated by the error of a physical line connected to a control device, and check information on a line transmitting and receiving the no input signal.

The control unit 150 may check information on a checked line and the no input signal and output a corresponding error notification in step S470.

Although an embodiment describes that the error of a signal line to which a databack signal is not input is checked and a notification is output, it may be processed that a corresponding signal line has an error event when the databack signal is not input a certain number of times or more.

Although an embodiment describes check and output operations of a data error and a line error separately based on the databack signal input from control devices, it is possible to perform data error verification and line verification simultaneously at the data monitoring unit 151 and the line monitoring unit 152 of the control unit 150 based on the databack signal.

Embodiments are mainly described above. However, they are only examples and do not limit the present invention. A person skilled in the art may appreciate that many variations and applications not presented above may be implemented without departing from the essential characteristic of embodiments. For example, each component specifically represented in embodiments may vary.

In addition, it should be construed that differences related to such a variation and such an application are included in the scope of the present invention defined in the following claims.

What is claimed is:

1. A device for controlling a high voltage direct current (HVDC) transmission system, the device comprising:
    a communication unit configured to communicate with a control device;
    an output unit configured to output information; and
    a control unit configured to:
    control the communication unit to obtain a databack signal;
    check for a data error based on error data included in the obtained databack signal;
    check for a line connection error based on whether the databack signal is obtained; and
    control the output unit to output a notification that the data error or the line connection error occurs,
    wherein the control unit is further configured to check for the data error and the line connection error together based on a same databack signal.

2. The device according to claim 1, wherein the databack signal comprises N databack groups each comprising M pulse signals.

3. The device according to claim 2, wherein the control unit is further configured to check the databack signal at a specific interval corresponding to a time when the pulse signals are input.

4. The device according to claim 1, wherein the control unit comprises:
    a data monitoring unit configured to extract the error data from the obtained databack signal and check for the data error; and
    a line monitoring unit configured to check for the line connection error.

5. The device according to claim 4, wherein the data monitoring unit is further configured to:
    extract at least one signal indicating that the error data is sensed as high from the obtained databack signal; and
    extract the databack signal including the at least one signal as the error data.

6. The device according to claim 5, wherein the data monitoring unit is further configured to extract the databack signal as the error data when a number of the at least one signal is equal to or greater than a reference number.

7. The device according to claim 4, wherein the line monitoring unit is further configured to:
    check presence of the databack signal; and
    identify a signal line having no databack signal as the line connection.

8. The device according to claim 7, wherein the line monitoring unit is further configured to identify the signal line as the line connection when the databack signal is not input at least a specific number of times.

9. A method of controlling a high voltage direct current (HVDC) transmission system, the method comprising:
    obtaining a databack signal from the HVDC transmission system;
    checking for a data error based on error data included in the obtained databack signal;
    checking for a line connection error based on whether the databack signal is obtained; and
    providing a notification that the data error or the line connection error occurs,
    wherein checking for the data error and the line connection error is performed together based on a same databack signal.

10. The method according to claim 9, wherein the databack signal comprises N databack groups each comprising M pulse signals.

11. The method according to claim 10, wherein checking for the data error comprises identifying whether data error signals of the M pulse signals are sensed as high.

12. The method according to claim 11, wherein checking for the data error further comprises identifying whether a number of the data error signals sensed as high is equal to or greater than a reference number.

13. The method according to claim 10, wherein checking for the line connection error comprises identifying a line connected to one of the N databack groups as the line connection when no input databack group signal is sensed among the corresponding M pulse signals.

14. The method according to claim 10, further comprising checking the databack signal at a specific interval corresponding to a time when the pulse signals are input.

15. The method according to claim 9, further comprising:
    checking presence of the databack signal; and
    identifying a signal line having no databack signal as the line connection.

16. The method according to claim 15, further comprising identifying the signal line as the line connection when the databack signal is not input at least a specific number of times.

17. The method according to claim 9, further comprising:
- extracting at least one signal indicating that the error data is sensed as high from the obtained databack signal; and
- extracting the databack signal including the at least one signal as the error data.

18. The device according to claim 2, wherein checking for the data error comprises identifying whether data error signals of the M pulse signals are sensed as high.

* * * * *